(12) United States Patent
Zhang

(10) Patent No.: US 8,148,957 B2
(45) Date of Patent: Apr. 3, 2012

(54) POWER SWITCH-MODE CIRCUIT WITH DEVICES OF DIFFERENT THRESHOLD VOLTAGES

(75) Inventor: Jason Zhang, Monterey Park, CA (US)

(73) Assignee: International Rectifier Corporation, El Segundo, CA (US)

( * ) Notice: Subject to any disclaimer, the term of this patent is extended or adjusted under 35 U.S.C. 154(b) by 656 days.

(21) Appl. No.: 12/108,569

(22) Filed: Apr. 24, 2008

(65) Prior Publication Data

US 2008/0265851 A1    Oct. 30, 2008

Related U.S. Application Data

(60) Provisional application No. 60/913,597, filed on Apr. 24, 2007.

(51) Int. Cl.
*G05F 1/40*    (2006.01)

(52) U.S. Cl. ........................................ 323/272; 323/225
(58) Field of Classification Search .................. 323/225, 323/271, 272, 282, 284
See application file for complete search history.

(56) References Cited

U.S. PATENT DOCUMENTS 6,489,756 B2 * 12/2002 Kanouda et al. ............... 323/284
7,638,991 B1 * 12/2009 Kobayashi .................... 323/272

* cited by examiner

*Primary Examiner* — Jessica Han
(74) *Attorney, Agent, or Firm* — Farjami & Farjami LLP

(57) ABSTRACT

The high side or low side FET of a buck converter, or both, are replaced by plural parallel devices of different threshold voltage and are turned on and off in a sequence which offers the best turn on and turn off characteristics related to high and low threshold voltages. The parallel devices can have the same or different active areas.

12 Claims, 4 Drawing Sheets

POWER SWITCH-MODE CIRCUIT WITH DEVICES OF DIFFERENT THRESHOLD VOLTAGES

RELATED APPLICATIONS

This application claims the benefit of U.S. Provisional Application No. 60/913,597, filed Apr. 24, 2007, the entire disclosure of which is incorporated by reference herein.

FIELD OF THE INVENTION

This invention relates to a switch mode power supply circuit such as a synchronous buck converter and more specifically relates to such a circuit with parallel switches of different threshold voltage.

BACKGROUND OF THE INVENTION

Switch-mode power supply circuits such as synchronous buck converters are well known. FIG. 1 shows a typical synchronous buck converter circuit in which an input d-c voltage Vin is applied to MOSFETs $Q_1$ and $Q_2$, which may be silicon or III-Nitride based devices. The node between $Q_1$ and $Q_2$ is connected to output inductor L and output capacitor C. The output voltage $V_o$ is connected to the output load which has a voltage lower than that of $V_{in}$.

In operation, an integrated circuit IC, of well known structure, is connected to the gates of $Q_1$ and $Q_2$ as shown by dotted lines and turns $Q_1$ and $Q_2$ on and off at a controlled frequency to maintain a fixed predetermined output voltage at node $V_o$. More particularly, FET $Q_2$ is turned on when $Q_1$ is off, and is turned off when $Q_1$ is off so that a current $I_L$ flows through inductor L. This drive circuit can be integrated with or separate from the MOSFETs $Q_1$ and $Q_2$.

Each FET $Q_1$ and $Q_2$ has a respective fixed threshold gate voltage $V_{TH}$ at which it turns on. Each threshold voltage will produce its own peak performance at different load conditions and different on/off conditions. The threshold voltage selected for each device is a trade-off value selected for acceptable performance over the range of load conditions. For example, at full output load the $V_{TH}$ of $Q_1$ should be low to reduce the $R_{DSON}$ of $Q_1$ and thus reduce turn on loss. At light load or no load however, the $V_{TH}$ of $Q_1$ should be higher to reduce turn-off loss without the penalty of too high an $R_{DSON}$ loss. Thus, in some cases it would be desirable if $Q_1$ were able to turn on with a lower $V_{TH}$ but turn off with a higher $V_{TH}$ for the lowest switching loss. However, the $V_{TH}$ of $Q_1$ must be selected as a trade-off for these opposing conditions.

As to FET $Q_2$, it would be desirable to have a high $V_{TH}$ for Cdv/dt immunity at turn off, but a low $V_{TH}$ drive at light load to minimize gate drive loss. Its $V_{TH}$ however, is selected at a trade-off value which would be acceptable over the range of load conditions.

BRIEF DESCRIPTION OF THE INVENTION

In accordance with the invention, one or both of FETs $Q_1$ and $Q_2$ is formed with at least 2 parallel devices of different $V_{TH}$ with separate gate connections. Thus, each device can have either of two (or more) different threshold voltages which are switched in and out, depending on load conditions. The individual FETs of each pair may be both silicon; or both III-Nitride such as a GaN device; or one or more silicon devices and one or more III-Nitride devices.

Further, the FETs with different threshold voltages can be respective discrete FETs in parallel or can be monolithically integrated in a common silicon or III-Nitride chip.

DETAILED DESCRIPTION OF THE PREFERRED EMBODIMENT

Figure 1:
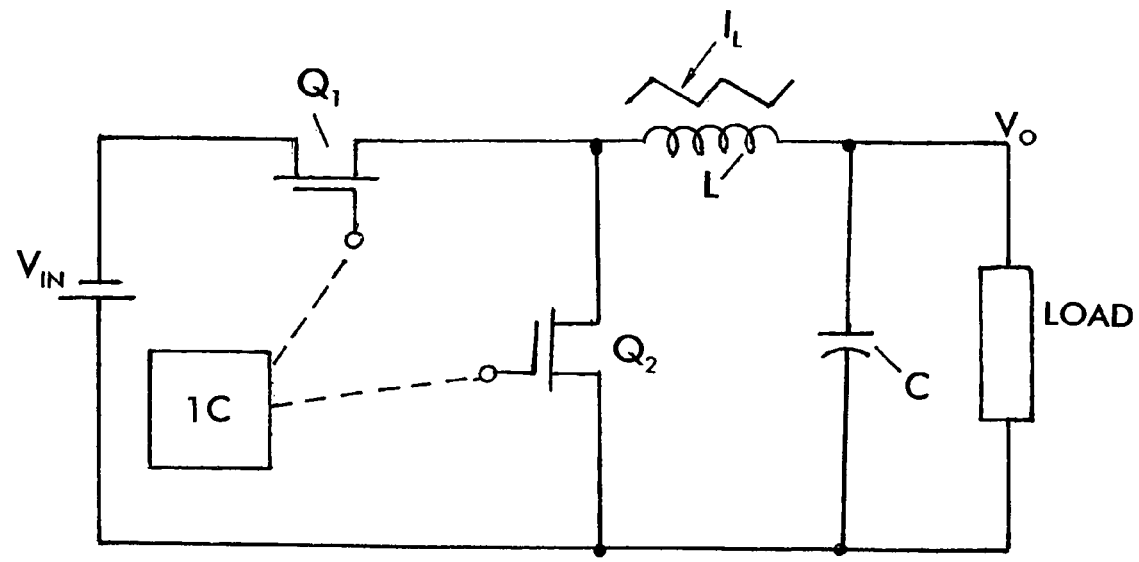
FIG. 1 shows a prior art switch mode power supply, in the form of a buck converter circuit with high-side and low-side switching devices of respectively fixed threshold voltages.
Figure 2:
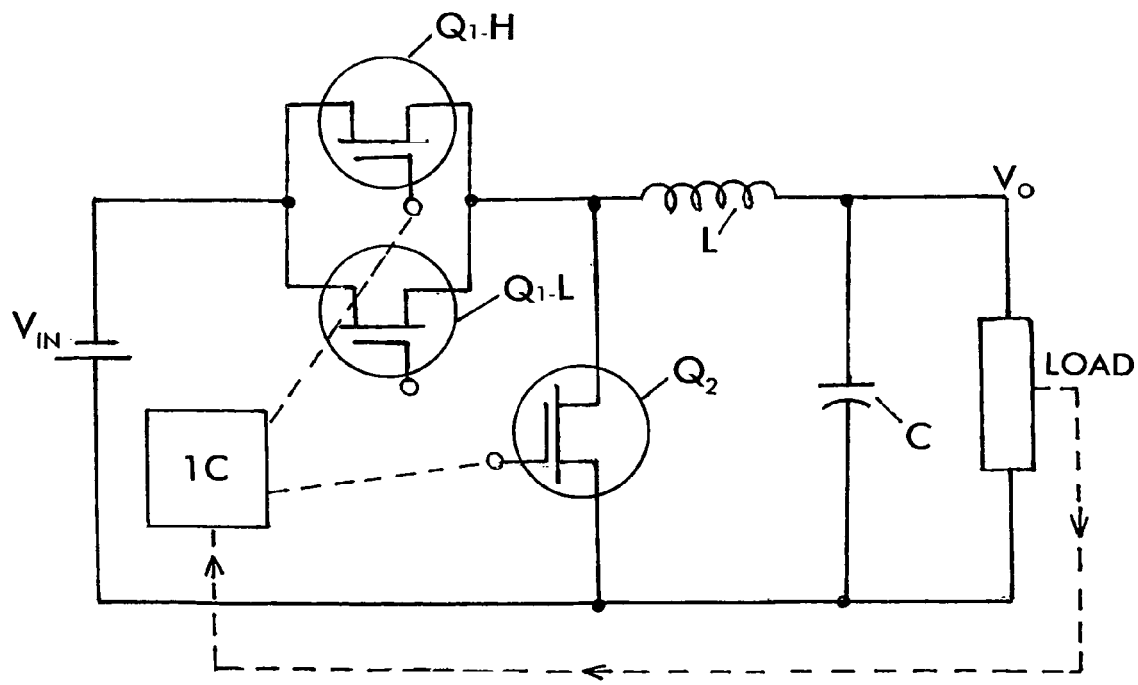
FIG. 2 shows a first embodiment of the invention in which the high side switching device consists of two FETs having different threshold voltage.

FIG. 2 shows the circuit of FIG. 1, modified to show the invention applied to FET $Q_1$ which consists of two (or more) parallel FETs, labeled $Q_1$-H and $Q_1$-L, having separate gate electrodes. FET $Q_1$-H has a higher $V_{TH}$ and FET $Q_1$-L has a lower $V_{TH}$ compared to that of FET $Q_1$-H. The FETs $Q_1$-L and $Q_1$-H may be sized differently and may have different active areas.

3 or more parallel FET could be used in the $Q_1$ position, each having a progressively higher $V_{TH}$.

Further, the IC may be coupled to the load as shown by dotted lines to provide gate signals to $Q_1$-H and $Q_1$-L in accordance with the measured load current.

Figure 3:
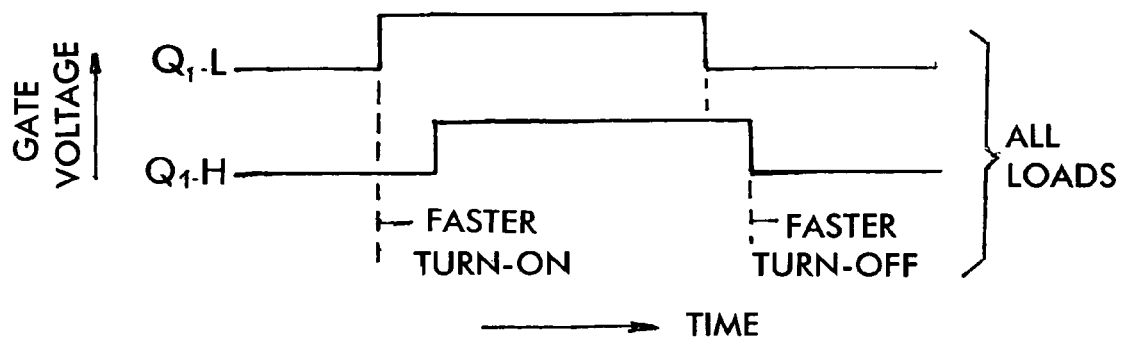
FIG. 3 shows a first drive scheme for driving the gates of the two high side FETs.

A first drive scheme for FETs $Q_1$-L and $Q_1$-H is shown in FIG. 3, where it is seen that the lower $V_{TH}$ FET $Q_1$-L, with faster turn on is first to turn on when gate voltage is applied from the IC, while $Q_1$-H, with higher $V_{TH}$ and faster turn off is last to turn off Thus, the arrangement of FIG. 2 has the benefit of both fast turn on and fast turn off, which is not possible with the prior art circuit and a single FET.

Figure 4:
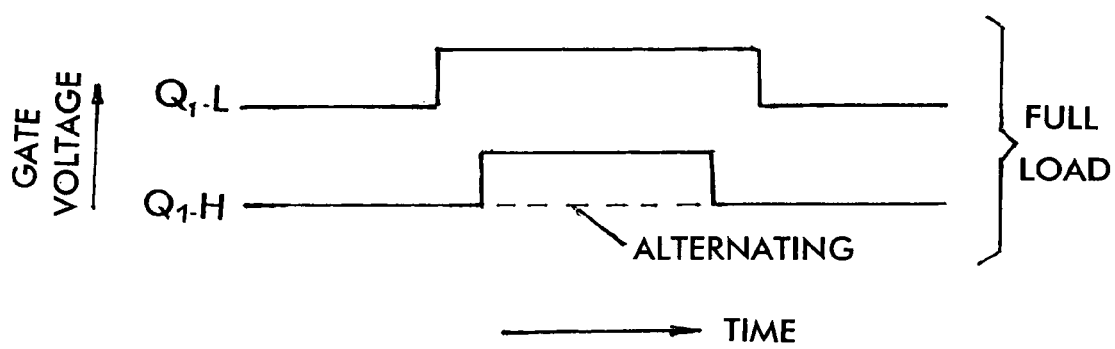
FIG. 4 shows a second drive scheme for driving the gates of the two high side FETs of FIG. 2 under a relatively high load condition.

FIG. 4 shows a second drive scheme, wherein, at full load, $Q_1$-L which is operable at reduced $R_{DSON}$ at high load is turned on first and off last. $Q_1$-H may turn on second and off first, or, if desired, may not turn on at all as shown by the alternate dotted line.

Figure 5:
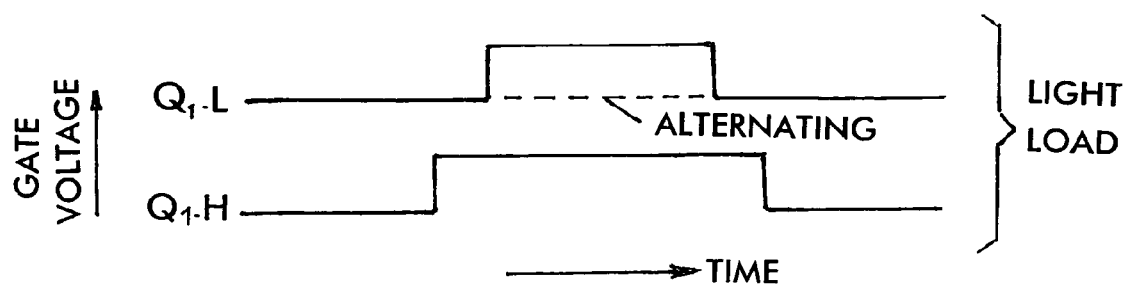
FIG. 5 shows the second drive scheme of FIG. 4 for driving the two high side FETs under a relatively low load condition.

FIG. 5 shows the second drive scheme for light load, where $Q_1$-H is first to turn on and last to turn off If desired, turn on of $Q_1$-L may be prevented at light load as shown by the alternative dotted line.

Note further that $Q_1$-L may be much smaller in active area than $Q_1$-H.

Figure 6:
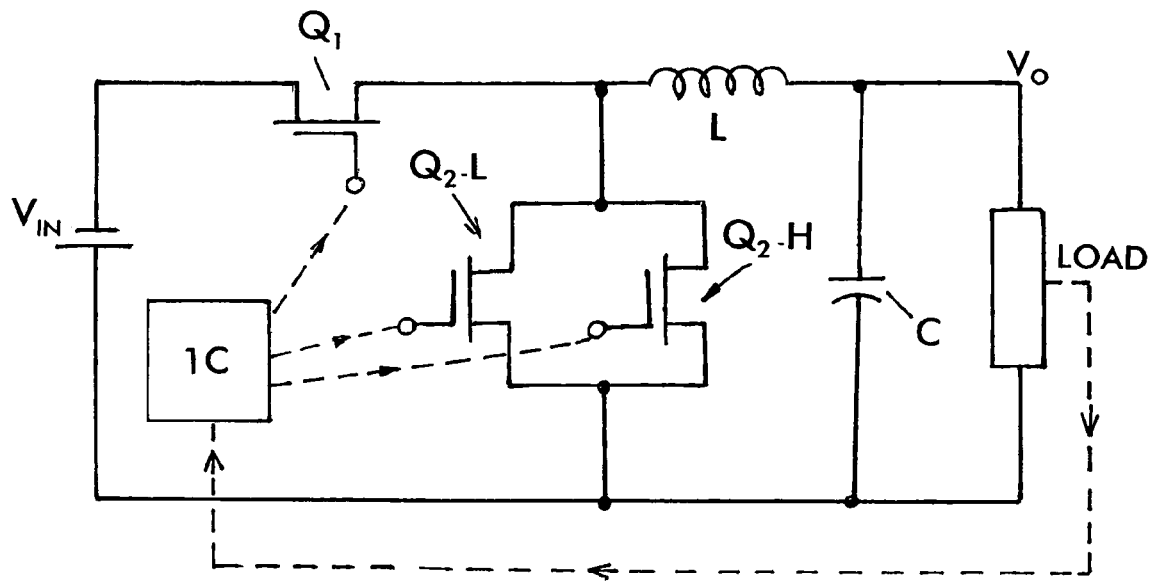
FIG. 6 shows a second embodiment of the invention in which low-side FET $Q_2$ of FIG. 1 consists of at least two FETs $Q_2$-L and $Q_2$-H respectively of different threshold voltages with $Q_2$-H having a higher $V_{TH}$ and $Q_2$-L having a relatively lower $V_{TH}$.

FIG. 6 shows the invention applied to FET $Q_2$, in which two or more parallel FETs $Q_2$-L and $Q_2$-H replace FET $Q_2$ in FIG. 1 and have a relatively low and a relatively high $V_{TH}$ respectively. For example, FET $Q_2$-L may have a $V_{TH}$ of about 3.3 volts and FET $Q_2$-H may have $QV_{TH}$ of about 5 volts.

FETs $Q_2$-L and $Q_2$-H have separate and isolated gates which will be driven by IC, depending on load conditions.

Figure 7:
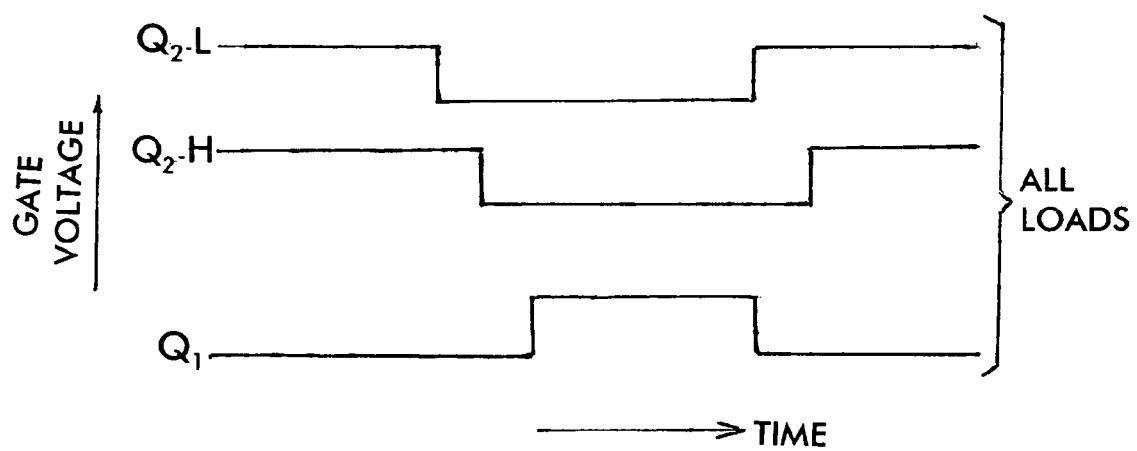
FIG. 7 shows a timing diagram of a first drive scheme for driving the FETs $Q_1$, $Q_2$-H and $Q_2$-L of the circuit of FIG. 6.

FIG. 7 shows a first drive scheme for FETs FETs $Q_2$-L and $Q_2$-H of FIG. 6. It is seen that FET $Q_2$-L with the lower $V_{TH}$ turns on first and $Q_2$-H with the higher $V_{TH}$ and better Cdv/dt immunity turns off last, thus making the best use of the threshold voltages of the two FETs.

Figure 8:
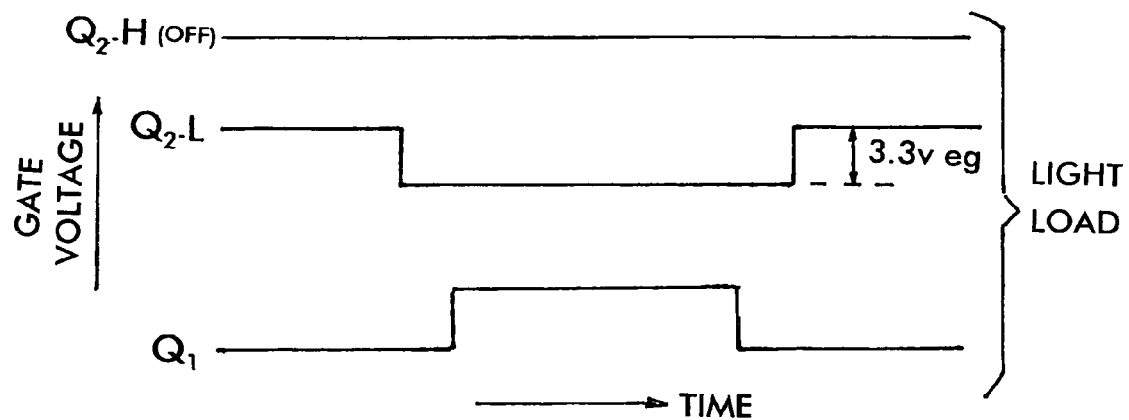
FIGS. 8 and 9 show second timing diagrams for FETs $Q_2$-L and $Q_2$-H for light loads and full loads respectively. Note that the gate voltage need not be a fixed value. Thus, a high voltage gate drive, for example, 5 volts and a low voltage gate drive, for example 3.3 volts can be applied to the high $V_{TH}$ and low $V_{TH}$ FETs respectively to reduce gate charge losses and enhance $R_{DSON}$. For example, at light load, only $Q_2$-L is switched with $Q_2$-H off, which reduces gate charge loss and improves efficiency at light load.
Figure 9:
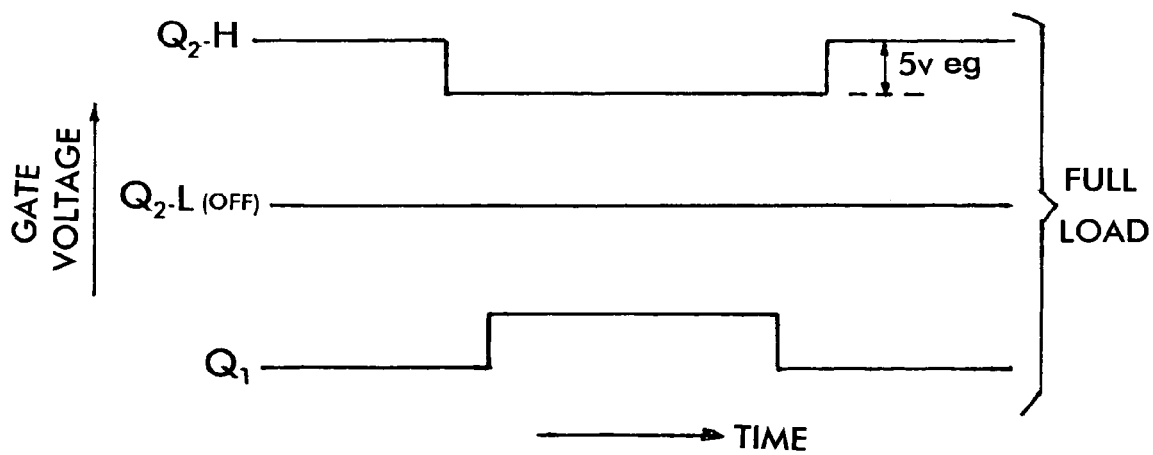

FIGS. 8 and 9 show a second drive scheme for the circuit of FIG. 6, where, under full load, (FIG. 9) only FET $Q_2$-H operates, while under light load, (FIG. 8) only FET $Q_2$-L operates. Note that the two FETs $Q_2$-H and FET $Q_2$-L) can have different active areas for the best $R_{DSON}$S.

It is also possible to combine FIGS. 2 and 6 together so that each of $Q_1$ and $Q_2$ are composed of plural parallel FETs of different $V_{TH}$S. Each of the parallel FETs can be copacked as a single discrete and can be in integrated form in silicon on GaN or the like.

While embodiments of the invention are shown for a buck converter, the invention has application to any other load switching.

Further, the invention can employ vertical conduction or lateral conduction or planar silicon MOSFETs or III-Nitride devices or combination of Silicon-based and III-Nitride based devices with diverse threshold voltages and preferred selection of such devices in response to load current.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. A switching converter having high side and low side switching devices;

at least one of said high side and low side switching devices comprising at least first and second transistors connected in parallel;

said at least first and second transistors having respective threshold voltages and said first transistor capable of being driven independently of said second transistor such that said first transistor is ON when said second transistor is OFF and such that said first transistor is OFF when said second transistor is ON;

the threshold voltage of said first transistor being higher than that of said second transistor.

2. The switching converter of claim 1, wherein each of said transistors is a silicon-based MOSFET.

3. The switching converter of claim 1, wherein said switching converter is a buck converter circuit.

4. The switching converter of claim 2, wherein said switching converter is a buck converter circuit.

5. The switching converter circuit of claim 4, wherein said high side switching device only consists of said at least two parallel connected transistors.

6. The switching converter of claim 5, which includes a drive circuit for turning said transistors on and off in a sequence dependent on the output load current of said converter.

7. The switching converter of claim 4, wherein said low side switching device only consists of said at least two parallel connected transistors.

8. The switching converter of claim 4, which includes a drive circuit for turning said transistors on and off in a sequence dependent on the output load current of said converter.

9. The switching converter circuit of claim 3, wherein said high side switching device only consists of said at least two parallel connected transistors.

10. The switching converter of claim 3, wherein said low side switching device only consists of said at least two parallel connected transistors.

11. The switching converter of claim 10, which includes a drive circuit for turning said transistors on and off in a sequence dependent on the output load current of said converter.

12. The switching converter of claim 1, which includes a drive circuit for turning said transistors on and off in a sequence dependent on the output load current of said converter.

* * * * *